United States Patent Office 3,166,571
Patented Jan. 19, 1965

3,166,571
1-PHENYL-1,2-CYCLOPROPANE
DICARBOXIMIDES
Patrick T. Izzo, Pearl River, N.Y., and Sidney R. Safir, River Edge, N.J., assignors to American Cyanamid Company, Stamford, Conn., a corporation of Maine
No Drawing. Filed June 6, 1962, Ser. No. 200,296
7 Claims. (Cl. 260—326.5)

This invention relates to new organic compounds. More particularly, it relates to cyclopropanedicarboximides and methods of preparing the same.

The novel compounds of the present invention can be illustrated by the following formula:

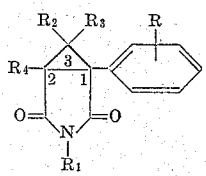

wherein $R_1$ and $R_4$ are hydrogen or a lower alkyl radical, $R_2$ and $R_3$ are hydrogen, lower alkyl or phenyl radicals and R is hydrogen, halo, lower alkyl or lower alkoxy.

The compounds of the present invention are, in general, white to yellow solids or viscous liquids. They are somewhat soluble in water and more soluble in organic solvents such as benzene, alcohols or acetone.

The present compounds can be prepared by several methods; however, the preferred laboratory method is reacting a maleimide with a diazoalkane to yield, as an intermediate, a pyrazoline. On heating the substituted pyrazoline the present compounds are obtained. This reaction can be illustrated as follows.

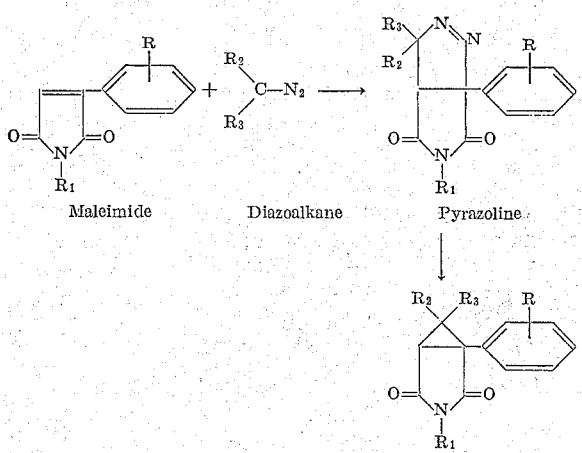

Maleimide       Diazoalkane       Pyrazoline wherein R, $R_1$, $R_2$ and $R_3$ are as hereinbefore defined.

The maleimides used as starting material in the present invention can be, for example, N-methyl-2-phenylmaleimide, N-ethyl-2-phenylmaleimide, N-propyl-2-phenylmaleimide, 2-(3',4',5'-trimethoxyphenyl)-maleimide, 2-(3',4',5'-triethoxyphenyl)-maleimide, N-methyl-2-p-chlorophenylmaleimide, N - ethyl - 2 - p - chlorophenylmaleimide, N-methyl-2-p-bromophenylmaleimide, N-ethyl-2-p - bromophenylmaleimide, N-methyl-2-p-tolylmaleimide, N-methyl-2-p-ethylphenylmaleimide, N-ethyl-2-p-tolylmaleimide, N-ethyl-2-p-ethylphenylmaleimide and the like.

The diazoalkanes of the present process can be, for example, diazomethane, phenyldiazomethane, diazopropane, diazoethane and the like.

The compounds of the present invention can also be prepared by reacting a halo lower alkyl ester, such as, for example, ethyl α-bromo-α-phenyl-acetate with an acrylic ester such as, for example, ethyl acrylate to produce, for example, 1-phenyl-1,2-di-lowercarbalkoxycyclopropane. The intermediate cyclopropane diester may be hydrolized to the half ester which can be converted through the acid halid, by reaction of the latter with ammonia or a primary lower alkylamine, to the ester amide. Treatment of the ester amide with a strong base such as, for example, alkali metal alkoxide produces the cyclopropanedicarboximides of the present invention. In those instances in which the products obtained possess a hydrogen atom at $R_1$, the hydrogen atom can be replaced with a lower alkyl group by treatment with an alkali metal alkoxide and a suitable lower alkyl halide. This method is the preferred commercial process for preparing the present compounds since it does not involve the use of biazoalkanes which may be hazardous in large scale operations.

The intermediates of the preferred procedure for preparing the present compounds are biologically active and can be represented by the following structural formula:

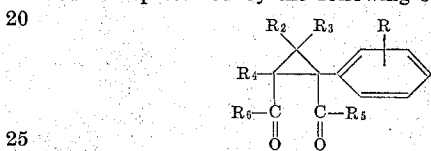

wherein $R_2$ and $R_3$ are members of the group consisting of hydrogen, lower alkyl and phenyl, $R_4$ is selected from the group consisting of hydrogen and lower alkyl, $R_5$ and $R_6$ are selected from the group consisting of hydroxyl, lower alkoxy and amino and R is selected from the group consisting of hydrogen, halo, lower alkyl and lower alkoxy.

The above compounds in addition to being directly convertible into the compounds of the present invention are physiologically active as central nervous system depressant agents and useful in medicine for this purpose. In addition, the above compounds have the ability to lower the blood sugar of experimental animals and may be useful in the treatment of diabetes.

The intermediate cyclopropane diester may also be prepared by a condensation of an α,β-dibromoester such as ethyl-α,β-dibromopropionate and an arylacetic ester such as ethyl phenylacetate. The specific product obtained from the above reactants is diethyl-1-phenyl-1,2-cyclopropanedicarboxylate. The cyclopropane diesters can be converted to the present compounds by the method described above.

The compounds of the present invention exhibit activity as central nervous system depressants. For this reason they are useful as tranquilizing agents, hypnotic agents or muscle relaxants. They can be dispensed in the usual pharmaceutical forms such as tablets, capsules, pills, powders, liquids and the like. Obviously inert ingredients can be used in obtaining the desired forms, such as excipients, fillers, flavors, distintegrating agents, etc.

The following examples illustrate in greater particularity the preparation of specific compounds of the present invention.

EXAMPLE I

*Preparation of N - methyl - 1 - phenyl-1,2-cyclopropanedicarboximide*

To a cold solution of 5.0 grams of N-methyl-2-phenylmaleimide in 750 ml. of ether is added an excess of an ethereal diazomethane solution. The resulting solution is stored at 5° C. for 15 hours. The white crystalline precipitate, N-methyl-3-phenyl-1-pyrazoline-3,4-dicarboximide, is collected and recrystallized from a methylene chloride-petroleum ether (65°–90° C.) mixture to give 4.2 grams of the product having a melting point of 108–109° C. d. A 2.5 gram portion of this product is dissolved in 25 ml. of absolute ethanol and warmed for 10 minutes. When the evolution of nitrogen has ceased, the alcohol is evaporated at reduced pressure leaving 2 grams of a colorless oil as residue. Partition chromatography of this oil using the system methanol-heptane gives 1.6 grams of N-methyl-1-phenyl-1,2-cyclopropanedicarboximide having a melting point of 55°–57° C. (from 50% aqueous ethanol).

EXAMPLE II

*Preparation of N,3-dimethyl-1-prenyl-1,2-cylcopropanedicarboximide*

To an ice cold solution of 6 grams of N-methyl-2-phenylmaleimide in 150 ml. of methylene chloride is added a dry ethereal solution of diazoethane. This diazoethane solution is added in portions allowing the deep yellow-orange color to be discharged before adding the next portion. When the color is no longer discharged, a slight excess of diazoethane solution is added and the solution is stored at 5° C. overnight. The solution is concentrated to about 50 ml. and 10 ml. of petroleum ether (30–60° C.) is added causing the precipitation of 2.1 grams of crystalline N,5-dimethyl-3-phenyl-1-pyrazoline-3,4-dicarboximide having a melting point of 106–107° C. with decomposition. An additional 5.1 grams is obtained by working up the mother liquor.

A 5.1 gram sample of the above pyrazoline is dissolved in 50 ml. of ethanol and heated on a steam bath for one hour. Evaporation of the solvent gives 4.4 grams of a viscous oil which on partition chromatography, using the system n-heptane-methyl Cellosolve, gives 4 grams of N,3-dimethyl-1-phenyl-1,2-cyclopropanedicarboximide as a viscous oil.

EXAMPLE III

*Preparation of N-methyl-1,3-diphenyl-1,2-cyclopropanedicarboximide*

To an ice-cold solution of 3.9 grams of N-methyl-2-phenylmaleimide in 50 ml. of methylene chloride is added a cold xylene solution of phenyldiazomethane. The xylene solution is added in portions to allow the deep red color of the diazo compound to be discharged. This addition is continued in increments until a slight coloration persisted. The solution is stored at 5° C. overnight, and then dried by the addition of magnesium sulfate, filtered and evaporated at reduced pressure, down to the residual xylene solution. Storage of this concentrate in the cold caused the precipitation of 2.5 grams of white, crystalline N-methyl-1,3-diphenyl-1,2-cyclopropanedicarboximide. One recrystallization from benzene and three from acetone gives needles with a melting point at 196–198° C.

EXAMPLE IV

*Preparation of N-methyl-1-(3',4',5'-trimethoxy phenyl)-1,2-cyclopropanedicarboximide*

To 50 ml. of 7.2 normal hydrochloric acid is added 18.3 grams of 3',4',5'-trimethoxyaniline. This paste is cooled to 0° C. and 20 grams of ice is added. The well-stirred mixture is slowly diazotized at 5° C. with a solution of 7 grams of sodium nitrite in 16 ml. of water. The resulting diazonium salt solution is filtered and added to an ice-cold solution of 9.7 grams of maleimide in 30 ml. of acetone. The pH of the resulting solution is adjusted to 3 by the addition of sodium acetate trihydrate and then 2.55 grams of cupric chloride dihydrate is added. The dark mixture is stirred for 30 minutes at 5° C., then allowed to rise slowly to room temperature and stored overnight. The precipitate is filtered and air dried. Recrystallization from acetone and from an acetone-ligroin (65–90° C.) mixture gives 7.9 grams of 2-chloro-3-(3',4',5'-trimethoxy-phenyl)-succinimide having a melting point at 206–208° C.

A 2 gram sample of the above product is mixed with 8 ml. of 2,6-lutidine and the mixture heated on a steam bath for 30 minutes. Twenty ml. of water is added and the crystals filtered and recrystallized from chloroform to give 1.5 grams of the yellow crystalline 2-(3',4',5'-trimethoxyphenyl) maleimide having a melting point of 212–213.5° C.

A 0.6 gram sample of this product is dissolved in 200 ml. of methylene chloride. The yellow solution is cooled in ice and an excess of ethereal diazomethane is added. The resulting solution is stored at 5° C. for 24 hours. Concentration of this solution at reduced pressure and cooling in an ice bath causes the precipitation of a white crystalline compound. A recrystallization from a methylene chloride-ether mixture gives 0.25 grams of the N-methyl-3-(3',4',5'-trimethoxyphenyl)-1 - pyrazoline-3,4 - dicarboximide having a melting point at 111–112° C. with decomposition.

A 6 gram sample of the above pyrazoline is warmed briefly in alcohol until the evolution of nitrogen stops. Concentration of the alcoholic solution to 25 ml. and cooling in an ice bath causes the precipitation of 3.3 grams of yellow crystals. To recrystallizations from alcohol gives 2.8 grams of N-methyl-1-(3',4',5'-trimethoxyphenyl)-1,2-cyclopropanedicarboximide having a melting point of 135–137° C.

EXAMPLE V

*Preparation of cis and trans-diethyl-1-phenyl-1,2-cyclopropanedicarboxylate*

To a well-stirred suspension of 9.5 grams of sodium hydride, prepared by adding 18.8 grams of sodium hydride-mineral oil dispersion (containing 52.3% of sodium hydride) to 400 ml. of anhydrous ether, under nitrogen atmosphere, is added dropwise a mixture composed of 32.8 grams of ethyl phenylacetate, 52 grams of ethyl 2,3-dibromopropionate and 4.6 grams of absolute ethanol. The first half of this mixture is added within 30 minutes. Then the addition is stopped and an additional 1 ml. of absolute ethanol is added directly to the reaction mixture. After another 30 minute interval, the addition of the second half of the ester-alcohol mixture is resumed and continued for 1½ hours. Stirring at room temperature is continued overnight. At the end of this itme, 2–3 ml. of ethanol is added and the mixture is washed successively with water, 1 normal hydrochloric acid, 5% sodium bicarbonate solution and with saturated sodium chloride solution. The organic solution is dried with magnesium sulfate and evaporated to a crude, oily product. Fractional distillation of this material yields 30.3 grams of diethyl-1-phenyl-1,2-cyclopropanedicarboxylate (boiling point 110–116° C. at 0.45 mm. pressure) as a mixture of cis- and trans-forms, which are separated by vapor phase chromatography.

The cis-diester is obtained in nearly pure form when the condensation is carried out with ethyl-α-bromophenylacetate (24.3 grams), ethyl acrylate (10 grams), absolute ethanol (1.5 ml.) and 4.6 grams of a sodium hydride-mineral oil dispersion (containing 2.4 grams of sodium hydride). The reaction is carried out and worked up as described above to give 13.8 grams of essentially cis-diethyl-1-phenyl-1,2-cyclopropanedicarboxylate (boiling point 124–130° C. at 0.7 mm. pressure).

EXAMPLE VI

*Preparation of cis-2-phenyl-2-carbethoxycyclopropanecarboxylic acid*

A 5 gram sample of cis-diethyl-1-phenyl-1,2-cyclopropanedicarboxylate is mixed with 80 ml. of ethanol and 20 ml. of 1 normal potassium hydroxide. This solution is refluxed for 2 hours. The mixture is concentrated to the aqueous phase and extracted with ether. The ether extract is discarded. Twenty milliliters of 1 normal hydrochloric acid are added to the aqueous alkaline phase and the mixture extracted three times with ether. The ether extract is dried and evaporated at reduced pressure to give a white solid. Recrystallization from ethanol-water gives 2 grams of cis-2-phenyl-2-carbethoxycyclopropanecarboxylic acid (melting point 101–102.5° C.).

EXAMPLE VII

*Preparation of cis-ethyl-1-phenyl-2carbamylcyclopropane-carboxylate*

A 0.5 gram sample of cis-2-phenyl-2-carbethoxycyclopropanecarboxylic acid is refluxed for 2 hours with 5 ml. of thionyl chloride. The excess of thionyl chloride is evaporated under reduced pressure and the residue is taken up in benzene. Gaseous ammonia is bubbled through the benzene solution and the ammoniacal mixture is allowed to stand at room temperature for 2 hours. Then it is washed with water, dried, and evaporated to give 25 mg. of a white solid which on recrystallization from benzene gives pure cis-ethyl-1-phenyl-2-carbamyl-cyclopropanecarboxylate (melting point 151–152° C.)

EXAMPLE VIII

*Preparation of 1-phenyl-1,2-cyclopropanedicarboximide*

A 2.5 g. sample of cis-ethyl-1-phenyl-2-carbamylcyclopropanecarboxylate is dissolved in 375 ml. of absolute ethanol. To this is added a solution of sodium ethoxide prepared by dissolving 259 mg. of metallic sodium in 75 ml. of absolute ethanol. The resulting alcoholic solution is allowed to stand at room temperature for 2 hours and then the solvent is evaporated off at reduced pressure. The residue is treated with 12 ml. of 1 N hydrochloric acid and the crystalline solid which forms is collected on a filter and dried. The yield is 2 g. This material is purified by dissolving it in 10 ml. of 1 N potassium hydroxide, filtering the alkaline solution and recovering the solid product by acidifying the filtrate with 10 ml. of 1 N hydrochloric acid. Recrystallization from aqueous ethanol gives pure 1-phenyl-1,2-cyclopropanedicarboximide, melting point 134–135° C.

EXAMPLE IX

*Preparation of N-methyl-1-phenyl-3-ethyl-1,2-cyclopropanedicarboximide*

To an ice-cold solution of 14.5 g. of N-methyl-2-phenylmaleimide in 280 ml. of methylene chloride is added in portions an anhydrous ether solution of diazopropane at such a rate as allowed the discharge of the orange color of the diazopropane before the next addition. When the color is no longer discharged, the solution is stored at 5° overnight and then concentrated at reduced pressure to about 100 ml. Cooling in an ice-bath causes the precipitation of 6.1 g. of white crystals, melting point 106–109° C. dec. Further concentration of the filtrate and cooling gives another 4.4 g. of the same product. Recrystallization of the two combined crystalline crops from a mixture of methylene chloride-petroleum ether (boiling point 30–60°) gives 5.2 g. of pure N-methyl-3-phenyl-5-ethyl-1-pyrazoline-3,4-dicarboximide, in the form of colorless needles, melting point 106–107° C. with decomposition.

A 5.2 g. sample of the above pyrazoline is dissolved in 50 ml. of ethyl alcohol and the solution is heated until the evolution of nitrogen ceased (30 minutes). The alcohol is evaporated at reduced pressure to give 5 g. of oily product which is purified by distillation under high vacuum and by two recrystallizations, one from a benzene-petroleum ether (boiling point 30–60°) mixture, and another from absolute ethanol. The purified N-methyl-1-phenyl-3-ethyl-1,2-cyclopropanedicarboximide is obtained thus in crystalline form melting at 83–98° C.

EXAMPLE X

*Preparation of 1-p-chlorophenyl-N,3-dimethyl-1,2-cyclopropanedicarboximide*

A quantity of 12.7 g. of p-chloroaniline is dissolved in 50 ml. of 7.2 normal hydrochloric acid with warming. The solution is cooled to 0° C. and diazotized with a solution of 7 g. of sodium nitrite in 16 ml. of water. The resulting diazonium solution is filtered and added to a cold suspension of 11.1 g. of N-methylmaleimide in 55 ml. of acetone. After the pH of the solution is adjusted to 3 by adding powdered sodium acetate trihydrate, 2.55 g. of cupric chloride dihydrate is added. The green solution is stirred at 0° C. for one half hour and then at 35°–40° C. for three hours. The yellow solid which precipitated is collected on a filter and pressed dry. Two recrystallizations from hot alcohol, one from a mixture of chloroform and petroleum ether (boiling point 30–60° C.), and further purification by chromatography using silica gel as the adsorbent and chloroform as the solvent gives pure N-methyl-2-p-chlorophenylmaleimide in the form of yellow crystals, melting point 144–146° C.

To 4.2 g. of this product dissolved in a cold mixture of 150 ml. of ether and 100 ml. of methylene chloride is added a cold ethereal solution of diazoethane in portions until a slight yellow coloration persisted. The solution is stored at 5° C. for 15 hours and then the solvents and the slight excess of diazoethane are distilled off to give 5.3 grams of a colorless, viscous oil. This product is heated with 50 ml. of ethanol at reflux for ½ hour and then the alcohol is distilled off to give 4.8 g. of syrupy material. This material is recrystallized three times from a mixture of benzene and petroleum ether (boiling point 30–60° C.) to give 1.9 g. of white crystals, melting point 85–95°. In spite of the wide range in melting point, this is pure 1-p-chlorophenyl-N,3-dimethyl-1,2-cyclopropanedicarboximide as indicated by elemental microanalysis, spectral U.V. and I.R. data and chemical saturation test with bromide in carbon tetrachloride.

EXAMPLE XI

*Preparation of N,3-dimethyl-1-p-tolyl-1,2-cyclopropanedicarboximide*

To a well stirred suspension of 7.5 g. of 2-p-tolyl-maleimide in 700 ml. of calcium hydride-dried tertiary butanol is added 2.2 grams of commercial sodium methoxide. The mixture is brought to reflux and a solution of 40 g. of methyl iodide in 75 ml. of tertiary butanol is slowly added (45 minutes). The mixture is held at reflux for 5½ hours, during which time another 20 g. of methyl iodide is added. At the end of this time, the solvent is distilled off at reduced pressure and the residue is partitioned between chloroform and water. The chloroform layer is separated, dried with magnesium sulfate and evaporated to give 9.3 g. of product. Several recrystallizations from hot alcohol and final purification by sublimation gives the pure pale yellow crystalline-N-methyl-2-p-tolylmaleimide, melting point 124–126° C.

To a cold solution of 3 g. of the above product in 75 ml. of ether is added in portions a cold, ethereal solution of diazoethane until a slight yellow color persists. The solution is stored in the cold for 24 hours and then the solvent and excess diazoethane are distilled off. A clear, colorless oil weighing 3.9 g. remains. This product is refluxed in 50 ml. of ethanol for 30 minutes and the alcohol is distilled off to give 3.5 g. of viscous oil. This material is crystallized by dissolving in 150 ml. of petroleum ether (boiling point 30–60°), concentrating to 75 ml. and allowing to stand at room temperature for 24 hours to give pure N,3-dimethyl-1-p-tolyl-1,2-cyclopropanedicarboximide as colorless, rhombic crystals, melting point 79–107° C.

EXAMPLE XII

*Preparation of diethyl-1-methyl-2-phenyl-1,2-cyclopropanedicarboxylate*

To a well-stirred suspension formed by mixing 4.6 grams of sodium hydride-mineral oil dispersion (containing 52.3% of sodium hydride) and about 400 ml.

of anhydrous ether, under nitrogen, is slowly added a mixture of 11.4 grams of ethyl methacrylate and 24.3 grams of ethyl α-bromophenyl acetate. During the course of the addition of the first ⅓ of the ester mixture, 1.5 ml. of absolute ethanol is added in 0.5 ml. portions. Then the addition is stopped, the reaction is heated to reflux and when it appears that the reaction is underway (by color change from grey to yellow), the remainder of the ester mixture is added dropwise. The mixture is stirred at room temperature for 15 hours and then worked up by adding 5 ml. of absolute ethanol to destroy unreacted sodium hydride and washing with a saturated sodium chloride solution and with water. The ether solution is dried (MgSO$_4$) and evaporated to give 22 grams of crude oil. Fractionation of this oil gives 4.1 grams of diethyl-1-methyl - 2 - phenyl-1,2-cyclopropanedicarboxylate (B.P. 105–110°/ca. 0.2 mm.) In this compound the carbethoxy groups bear a cis-relationship to each other.

EXAMPLE XIII

*Preparation of 1-methyl-2-carbethoxy-2-phenylcyclopropanecarboxylic acid*

A 5.6 gram sample of diethyl-1-methyl-2-phenyl-1,2-cyclopropanedicarboxylate prepared above is dissolved in 110 ml. of ethanol and the solution treated with 20 ml. of 1 normal potassium hydroxide solution. The mixture is heated under reflux for 4 hours and then most of the ethanol is distilled off at reduced pressure. To the milky, nearly neutral residue is added 50 ml. of water and 2 drops of 1 normal potassium hydroxide solution. The resulting mixture is extracted twice with 20 ml. portions of chloroform and once with 20 ml. of ether. The extracts are discarded and the aqueous solution is treated with 20.5 ml. of 1 normal hydrochloric acid. The precipitated oil is extracted three times with 25 ml. portions of chloroform. The combined chloroform solution is dried (MgSO$_4$) and evaporated to give 3.3 grams of oily product. In this compound the carboxyl and carbethoxy groups bear a cis-relationship to each other.

EXAMPLE XIV

*Preparation of ethyl-1-phenyl-2methyl-2-carbamylcyclopropanecarboxylate*

To a well-stirred solution of 1.2 grams of 1-methyl-2-carbethoxy-2-phenylcyclopropanecarboxylic acid in 25 ml. of methylene chloride is added 0.5 gram of triethylamine. The solution is cooled to 0° C. and 0.6 gram of ethyl chloroformate is added. The mixture is stirred at 0° C. for one hour. Then 50 ml. of 15% aqueous dibasic ammonium phosphate is added and the resulting mixture is stirred vigorously for four hours at room temperature. The methylene chloride layer is separated, washed with water and dried (MgSO$_4$). Evaporation of the solvent gives 1 gram of crystalline residue which is recrystallized from ethyl acetate to give white, crystalline ethyl-1-phenyl-2-methyl-2-carbamylcyclopropanecarboxylate, melting point 154–156° C. In this compound the carbethoxy and carbamyl groups bear a cis-relationship to each other.

EXAMPLE XV

*Preparation of 2-methyl-1-phenyl-1,2-cyclopropane-dicarboximide*

A 0.5 gram sample of ethyl-1-phenyl-2-methyl-2-carbamylcyclopanecarboxylate is dissolved in 90 ml. of absolute ethanol and the resulting solution is treated with 9.5 ml. of absolute ethanol in which about 47.5 milligrams of metallic sodium has been previously dissolved. The colorless solution is stored at room temperature for 3 hours and the solution is concentrated to about 10 ml. Treatment of the concentrate with 2.2 ml. of 1 normal hydrochloric acid, concentrating further and cooling gives 400 milligrams of white crystals. The product is purified further by dissolving it in 4 ml. of 0.5 normal potassium hydroxide, filtering the solution and acidifying the filtrate with 2 ml. of 1 normal hydrochloric acid. The precipitated, crystalline product is collected, filtered and dried, melting point 138–139° C.

EXAMPLE XVI

*Preparation of diethyl-1-phenyl-3-methyl-1,2-cycylopropane-dicarboxylate*

This compound is prepared by reacting 24.3 grams of ethyl α-bromophenylacetate with 11.4 grams of ethyl crotonate in the presence of 4.6 grams of sodium hydride-mineral oil dispersion in ether using the procedure described in Example XII. The final product is obtained in nearly pure form by fractional distillation. The yield is 4.9 g. (B.P. 112–127°/0.2–0.3 mm.). In this compound the carbethoxy groups bear a cis-relationship to each other.

EXAMPLE XVII

*Preparation of 2-phenyl-2-carbethoxy-3-methylcyclopropanecarboxylic acid*

A 2.1 gram sample of diethyl-1-phenyl-3-methyl-1,2-cyclopropanedicarboxylate is dissolved in 40 ml. of ethanol. To the alcoholic solution is added 7.6 ml. of 1 normal potassium hydroxide solution and the resulting mixture is refluxed for 2 hours. The reaction is worked up as described in Example XIII. The product, 2-phenyl-2-carbethoxy-3-methylcyclopropanecarboxylic acid is obtained as a viscous oil (1.6 grams). In this compound the carbethoxy and carboxyl groups bear a cis-relationship to each other.

EXAMPLE XVIII

*Preparation of ethyl-1-phenyl-2-carbamyl-3-methylcyclopropanecarboxylate*

A 2.2 gram sample of 2-carbethoxy-2-phenyl-3-methylcyclopropanecarboxylic acid is dissolved in 50 ml. of methylene chloride and reacted with 0.9 gram of triethylamine and 1 gram of ethyl chloroformate following the procedure described in Example XIV. The product obtained as a crystalline solid weighs 1.7 grams. Recrystallization from aqueous ethanol yields the product, melting point 136–141° C. In this compound the carbethoxy and carbamyl groups bear a cis-relationship to each other.

EXAMPLE XIX

*Preparation of 1-phenyl-3-methyl-1,2-cyclopropanedicarboximide*

A 0.5 gram sample of ethyl-1-phenyl-2-carbamyl-3-methylcyclopropanecarboxylate is dissolved in 90 ml. of absolute ethanol and treated with an absolute alcohol solution of sodium ethoxide prepared by dissolving 47.5 milligrams of metallic sodium in 9.5 ml. of absolute ethanol. The procedure and work-up described in Example XV were followed. Four hundred milligrams of crystalline product is obtained, melting point 144–147° C. (from either a mixture of chloroform and petroleum ether or aqueous ethanol).

EXAMPLE XX

*Preparation of N-methyl-1-phenyl-1,2-cyclopropanedicarboximide*

To about 200 ml. of anhydrous tetrahydrofuran under nitrogen atmosphere is added 0.88 grams of a 54.7% sodium hydride-mineral oil dispersion. The mixture is stirred and 2.5 grams of trimethylsulfoxonium chloride is added all at once. The reaction mixture is held at refluxing temperature for 45 minutes. At the end of this time a warm solution of 3.6 grams of N-methyl-2-phenylmaleimide in about 50 ml. of anhydrous tetrahydrofuran is added dropwise over a period of about 15 minutes, and refluxing is continued two hours. The reaction mixture is cooled and 5 ml. of absolute alcohol is stirred in. The solvent is distilled off at reduced pressure to give a purple, tarry residue. This is dissolved in 100 ml. of methylene chloride. The solution thus obtained is washed three times with 25 ml. portions of water, dried with magnesium sulfate and evaporated to a yellow oil (2.5 grams). This oil is evaporatively distilled at 90–100°/0.01 mm. to give a liquid which upon trituration with petroleum ether and crystallization from aqueous alcohol gives the crystalline product, melting point 53°–55° C.

EXAMPLE XXI

*Preparation of N-methyl-2-ethyl-1-phenyl-1,2-cyclopropanedicarboximide*

To about 150 ml. of anhydrous tetrahydrofuran under nitrogen atmosphere is added 0.53 grams of a 54.7% sodium hydride-mineral oil dispersion. The mixture is stirred and 1.5 grams of trimethylsulfoxonium chloride is added. The resulting mixture is refluxed for 45 minutes and then a solution of 2.5 grams of N-methyl-2-ethyl-3-phenylmaleimide in 10 ml. of anhydrous tetrahydrofuran is added over 10 minutes. The reaction is continued and worked up in the manner described in Example XX. Evaporation of the methylene chloride solution gives 2.2 grams of oil which solidifies on trituration with petroleum ether. Recrystallization of the solid from aqueous alcohol gives 1.8 g. of the pure product, melting point 113–114° C.

The above Examples XX and XXI illustrate that cyclopropanedicarboximides of the following type:

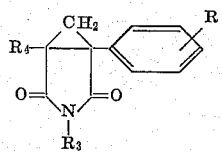

in which $R_5$ is lower alkyl and R and $R_4$ are as hereinbefore defined can be prepared by treating maleimides of the formula:

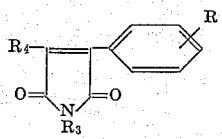

wherein R, $R_4$ and $R_5$ are as defined above with a trialkylsulfoxonium halide such as trimethylsulfoxonium chloride and a strong base such as sodium hydride in an inert solvent such as tetrahydrofuran.

We claim:

1. A compound of the formula:

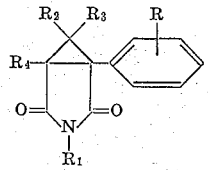

where $R_1$ and $R_4$ are members of the group consisting of hydrogen and lower alkyl, $R_2$ and $R_3$ are members of the group consisting of hydrogen, lower alkyl and phenyl, R is a member of the group consisting of hydrogen, halo, lower alkyl and lower alkoxy, and at least one of the R groups being other than hydrogen.

2. The compound N-3-dimethyl-1-phenyl-1,2-cyclopropanedicarboximide.

3. The compound N-methyl-1-(3',4',5'-trimethoxyphenyl)-1,2-cyclopropanedicarboximide.

4. The compound N-methyl-1-phenyl-3-ethyl-1,2-cyclopropanedicarboximide.

5. The compound 1-p-chlorophenyl-N,3-dimethyl-1,2-cyclopropanedicarboximide.

6. The compound 2-methyl-1-phenyl-1,2-cyclopropanedicarboximide.

7. The compound 1-phenyl-3-methyl-1,2-cyclopropanedicarboximide.

References Cited in the file of this patent
UNITED STATES PATENTS

| | | |
|---|---|---|
| 2,652,418 | De Groote | Sept. 15, 1953 |
| 2,876,234 | Hurwitz, et al. | Mar. 3, 1959 |
| 2,878,264 | Lunsford | Mar. 17, 1959 |
| 2,969,386 | McElroy | Jan. 24, 1961 |
| 3,098,076 | Baltzly et al. | July 16, 1963 |

FOREIGN PATENTS

| | | |
|---|---|---|
| 872,300 | Great Britain | July 5, 1961 |

OTHER REFERENCES

Baltzly et al.: "J. Org. Chem.," vol. 26, pages 3669–76 (1961).

Baltzly et al.: "J. Org. Chem.," vol. 27, pages 213–18 (1962).

UNITED STATES PATENT OFFICE
CERTIFICATE OF CORRECTION

Patent No. 3,166,571                          January 19, 1965

Patrick T. Izzo et al.

It is hereby certified that error appears in the above numbered patent requiring correction and that the said Letters Patent should read as corrected below.

Column 2, line 15, for "biazoalkanes" read -- diazoalkanes --; column 9, lines 30 to 35, the formula should appear as shown below instead of as in the patent:

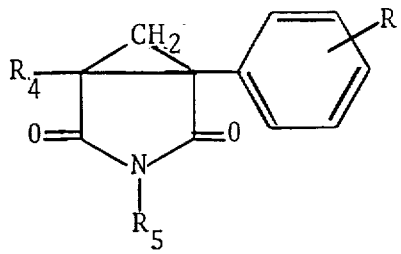

Same column 9, lines 41 to 45, the formula should appear as shown below instead of as in the patent:

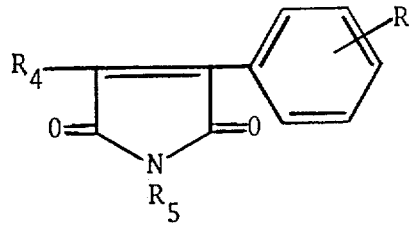

Signed and sealed this 15th day of June 1965.

(SEAL)
Attest:

ERNEST W. SWIDER                           EDWARD J. BRENNER
Attesting Officer                           Commissioner of Patents